(12) United States Patent
Zhu et al.

(10) Patent No.: US 11,066,861 B2
(45) Date of Patent: Jul. 20, 2021

(54) NOTEBOOK COMPUTER

(71) Applicant: Huawei Technologies Co., Ltd., Shenzhen (CN)

(72) Inventors: Mingchao Zhu, Wuhan (CN); Heng Yang, Shenzhen (CN); Haitao Zhen, Wuhan (CN); Xueqiang Li, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/470,812

(22) PCT Filed: May 12, 2017

(86) PCT No.: PCT/CN2017/084159
§ 371 (c)(1),
(2) Date: Jun. 18, 2019

(87) PCT Pub. No.: WO2018/113172
PCT Pub. Date: Jun. 28, 2018

(65) Prior Publication Data
US 2019/0383073 A1 Dec. 19, 2019

(30) Foreign Application Priority Data
Dec. 19, 2016 (CN) .......................... 201611177011.2

(51) Int. Cl.
*G06F 1/16* (2006.01)
*G06F 3/041* (2006.01)
*E05D 7/10* (2006.01)

(52) U.S. Cl.
CPC ............ *E05D 7/10* (2013.01); *G06F 1/1654* (2013.01); *G06F 1/1669* (2013.01); *G06F 1/1681* (2013.01); *G06F 3/041* (2013.01)

(58) Field of Classification Search
CPC ....... E05D 7/10; G06F 1/1654; G06F 1/1669; G06F 1/1681; G06F 3/041; G06F 1/1683; G06F 1/1618
See application file for complete search history.

(56) References Cited

U.S. PATENT DOCUMENTS 5,666,694 A    9/1997   Slow et al.
5,812,356 A *   9/1998   O'Connor ............. G06F 1/1632
                                                     335/179

(Continued)

FOREIGN PATENT DOCUMENTS

CN         2727825 Y     9/2005
CN         2821642 A     9/2006

(Continued)

OTHER PUBLICATIONS

Machine Translation and Abstract of Chinese Publication No. CN104238661, Dec. 24, 2014, 30 pages.

(Continued)

*Primary Examiner* — Adrian S Wilson
*Assistant Examiner* — Theron S Milliser
(74) *Attorney, Agent, or Firm* — Conley Rose, P.C.

(57) ABSTRACT

A notebook computer includes a tablet computer and a keyboard dock. The tablet computer includes a tablet computer body, a first hinge cover, and a first hinge, where a first end of the first hinge is connected to the first hinge cover, a second end of the first hinge is connected to the tablet computer body, and the first hinge cover is used for rotating relative to the tablet computer body around a central axis of the first hinge. The keyboard dock includes a keyboard dock body, a second hinge cover, and a second hinge, where a first end of the second hinge is connected to the second hinge cover, a second end of the second hinge is connected to the keyboard dock body, and the second hinge cover is used for (Continued)

rotating relative to the keyboard dock body around a central axis of the second hinge.

20 Claims, 9 Drawing Sheets

(56) References Cited

U.S. PATENT DOCUMENTS

| | | | | |
|---|---|---|---|---|
| 6,028,764 | A * | 2/2000 | Richardson | G06F 1/1616 248/917 |
| 6,437,973 | B1 * | 8/2002 | Helot | G06F 1/1616 248/161 |
| 6,512,670 | B1 * | 1/2003 | Boehme | G06F 1/1616 312/223.2 |
| 6,989,985 | B2 * | 1/2006 | Tanimoto | G06F 1/162 16/255 |
| 7,412,271 | B2 * | 8/2008 | Cheng | H04M 1/0254 379/433.13 |
| 8,091,180 | B2 * | 1/2012 | Wang | G06F 1/162 16/348 |
| 8,390,997 | B1 * | 3/2013 | Dominy | G06F 1/1616 361/679.05 |
| 8,484,809 | B2 * | 7/2013 | Fiedler | A45C 13/1069 220/230 |
| 9,158,135 | B1 * | 10/2015 | Chaboud | G02F 1/0102 |
| 9,176,536 | B2 * | 11/2015 | Kerr | G06F 1/1616 |
| 9,277,661 | B2 * | 3/2016 | Andre | E05C 19/16 |
| 9,377,815 | B2 * | 6/2016 | Chen | G06F 1/1632 |
| 9,645,614 | B2 * | 5/2017 | Delpier | G06F 1/1632 |
| 9,680,253 | B2 * | 6/2017 | Mehandjiysky | G06F 1/1632 |
| 9,897,249 | B2 * | 2/2018 | Li | F16M 13/005 |
| 10,088,864 | B2 * | 10/2018 | Aoki | F16M 11/2007 |
| 10,139,862 | B1 * | 11/2018 | Nakamura | G06F 1/1654 |
| 10,303,213 | B2 * | 5/2019 | Shaw | H01F 7/0263 |
| 2011/0070828 | A1 * | 3/2011 | Griffin | H04M 1/7253 455/41.1 |
| 2011/0279992 | A1 * | 11/2011 | Wakimoto | G06F 1/1626 361/807 |
| 2012/0069540 | A1 * | 3/2012 | Lauder | G06T 1/00 361/807 |
| 2013/0219661 | A1 * | 8/2013 | Ge | G06F 1/1681 16/367 |
| 2013/0242495 | A1 * | 9/2013 | Bathiche | H01R 11/30 361/679.28 |
| 2014/0198441 | A1 | 7/2014 | Sharma et al. | |
| 2014/0211409 | A1 * | 7/2014 | Wolff | G06F 1/1632 361/679.43 |
| 2014/0247546 | A1 | 9/2014 | Whitt, III et al. | |
| 2014/0254077 | A1 * | 9/2014 | Griffin | G06F 1/16 361/679.08 |
| 2014/0362510 | A1 * | 12/2014 | Hirano | G06F 1/1626 361/679.17 |
| 2015/0146356 | A1 | 5/2015 | Sharma et al. | |
| 2015/0301564 | A1 | 10/2015 | Chang et al. | |
| 2015/0378392 | A1 | 12/2015 | Siddiqui et al. | |
| 2016/0048363 | A1 * | 2/2016 | North | G06F 1/1616 345/1.1 |
| 2016/0202727 | A1 | 7/2016 | Lin et al. | |
| 2017/0045917 | A1 | 2/2017 | Rosen et al. | |
| 2017/0168526 | A1 * | 6/2017 | Fujikawa | G06F 1/1615 |
| 2017/0364220 | A1 * | 12/2017 | Karl | G06F 3/016 |
| 2018/0046226 | A1 * | 2/2018 | Bowers | E05B 51/005 |
| 2018/0054905 | A1 * | 2/2018 | Maatta | H05K 5/0221 |

FOREIGN PATENT DOCUMENTS

| | | |
|---|---|---|
| CN | 201623737 U | 11/2010 |
| CN | 201984375 U | 9/2011 |
| CN | 103309401 A | 9/2013 |
| CN | 103488252 A | 1/2014 |
| CN | 104094185 A | 10/2014 |
| CN | 104238661 A | 12/2014 |
| CN | 105700624 A | 6/2016 |
| JP | H09130058 A | 5/1997 |
| JP | H11219232 A | 8/1999 |
| JP | 2010078112 A | 4/2010 |
| TW | 201642295 A | 12/2016 |
| WO | 2015092942 A1 | 6/2015 |

OTHER PUBLICATIONS

Machine Translation and Abstract of Chinese Publication No. CN2727825, Sep. 21, 2005, 13 pages.
Machine Translation and Abstract of Chinese Publication No. CN2821642, Sep. 27, 2006, 12 pages.
Machine Translation and Abstract of Chinese Publication No. CN105700624, Jun. 22, 2016, 21 pages.
Lee, K., "10 Best 2-in-1 Laptops 2016: Best Hybrid Laptops Reviewed," Oct. 7, 2016, 106 pages.
Foreign Communication From a Counterpart Application, PCT Application No. PCT/CN2017/084159, English Translation of International Search Report dated Sep. 25, 2017, 2 pages.
Foreign Communication From a Counterpart Application, PCT Application No. PCT/CN2017/084159, English Translation of Written Opinion dated Sep. 25, 2017, 4 pages.
Foreign Communication From a Counterpart Application, European Application No. 17882448.8, Extended European Search Report dated Oct. 23, 2019, 13 pages.

* cited by examiner

NOTEBOOK COMPUTER

CROSS-REFERENCE TO RELATED APPLICATIONS

This application is a U.S. National Stage of International Patent Application No. PCT/CN2017/084159 filed on May 12, 2017, which claims priority to Chinese Patent Application No. 201611177011.2 filed on Dec. 19, 2016. Both of the aforementioned applications are hereby incorporated by reference in their entireties.

TECHNICAL FIELD

This application relates to the computer field, and in particular, to a notebook computer.

BACKGROUND

At present, a notebook computer generally includes a display screen that can be opened or closed, a portable mainframe (including a keyboard and various interfaces), a rechargeable battery, and other components. Compared with a desktop computer, the notebook computer has advantages such as a light weight, a small size, and portability, and is widely used in professional applications, office, conferences, entertainment, business, and the like.

Notebook computer technologies are developing rapidly. A 360-degree convertible two-in-one notebook computer, represented by Lenovo YOGA, is well accepted by users, and can bring different usage mode experience to the users. The YOGA notebook computer can be freely flipped around four different screen angles, including notebook (Notebook), tablet (Tablet), stand (Stand), and tent (Tent). With some simple manual adjustments made by a user, YOGA is immediately adapted to an operation of the user in a most appropriate usage mode.

However, Lenovo YOGA uses a connected dual-axis hinge (as shown in FIG. 1) or a chain hinge (as shown in FIG. 2) to implement 360-degree flipping. When Lenovo YOGA is used as a tablet computer, a display end and a mainframe end cannot be separated. Therefore, Lenovo YOGA in a tablet computer mode seems relatively thick and heavy.

SUMMARY

Embodiments of this application provide a notebook computer, to allow the notebook computer to be opened or closed at any angle and detachable in a tablet computer mode making the notebook computer more lightweight and convenient.

A first aspect of the embodiments of this application provides a notebook computer, where the notebook computer includes a tablet computer and a keyboard dock.

The tablet computer includes a tablet computer body, a first hinge cover, and a first hinge, where a first end of the first hinge is connected to the first hinge cover, a second end of the first hinge is connected to the tablet computer body, and the first hinge cover is used for rotating relative to the tablet computer body around a central axis of the first hinge. In other words, the first hinge cover may rotate relative to the tablet computer body around the central axis of the first hinge. Under the action of external force, for example, in a process of opening or closing the notebook computer, the first hinge cover rotates around the central axis of the first hinge in a direction of opening or closing the notebook computer.

The keyboard dock includes a keyboard dock body, a second hinge cover, and a second hinge, where a first end of the second hinge is connected to the second hinge cover, a second end of the second hinge is connected to the keyboard dock body, and the second hinge cover is used for rotating relative to the keyboard dock body around a central axis of the second hinge. In other words, the second hinge cover may rotate relative to the keyboard dock body around the central axis of the second hinge. Under the action of external force, for example, in a process of opening or closing the notebook computer, the second hinge cover rotates around the central axis of the second hinge in a direction of opening or closing the notebook computer.

The tablet computer and the keyboard dock are connected by using the first hinge cover and the second hinge cover, and the first hinge cover is connected to the second hinge cover in a detachable manner.

When the notebook computer provided in this embodiment of this application is in a notebook mode, the first hinge cover and the second hinge cover are always relatively static. When the tablet computer rotates from 0 degrees to 180 degrees, the first hinge cover, the second hinge cover, the second hinge, and the keyboard dock body are relatively static, and the tablet computer body rotates relative to the first hinge cover around the first hinge. When the tablet computer rotates to 180 degrees, the first hinge is locked, the tablet computer body stops rotating, and the second hinge starts working. When the tablet computer rotates from 180 degrees to 360 degrees, the tablet computer body, the first hinge cover, the first hinge, and the second hinge cover are relatively static, and the keyboard dock body rotates relative to the second hinge cover around the second hinge. In addition, the first hinge cover is connected to the second hinge cover in a detachable manner, so that the tablet computer can be detached from the keyboard dock, making the notebook computer in the tablet computer mode more lightweight and convenient and bringing more and better usage mode experience to users.

With reference to the first aspect of the embodiments of this application, in a first implementation of the first aspect of the embodiments of this application, a concave groove is disposed on the first hinge cover, a convex tenon is disposed on the second hinge cover, and the first hinge cover is connected to the second hinge cover by connecting the convex tenon to the concave groove. The connection manner implemented by using the concave groove and the convex tenon allows the first hinge cover to be flexibly separated from the second hinge cover, that is, allows the tablet computer of the notebook computer to be separated from the keyboard dock.

With reference to the first implementation of the first aspect of the embodiments of this application, in a second implementation of the first aspect of the embodiments of this application, the concave groove is disposed on an outer side of the first hinge cover, and may specifically include a first concave groove and a second concave groove that are symmetrically disposed relative to a midperpendicular of the first hinge cover;

the convex tenon is disposed on an outer side of the second hinge cover, and may specifically include a first convex tenon and a second convex tenon that are symmetrically disposed relative to a midperpendicular of the second hinge cover; and a linear distance between the first concave groove and the second concave second convex tenon. In this way, the concave groove can match the convex tenon in a relatively aesthetic manner, to facilitate assembly of the notebook computer.

With reference to the first aspect of the embodiments of this application, in a third implementation of the first aspect of the embodiments of this application, a first magnet is disposed inside the first hinge cover, a second magnet is disposed inside the second hinge cover, and the first hinge cover is magnetically connected to the second hinge cover by using the first magnet and the second magnet. The first hinge cover may be flexibly separated from the second hinge cover by using a magnetic force between the magnets, so as to implement separation of the tablet computer of the notebook computer from the keyboard dock.

With reference to the first aspect of the embodiments of this application, the first implementation of the first aspect, the second implementation of the first aspect, or the third implementation of the first aspect, in a fourth implementation of the first aspect of the embodiments of this application, the first hinge is disposed inside the first hinge cover, and there are one or two first hinges and the second hinge is disposed inside the second hinge cover, and there are one or two second hinges.

The first hinge may be disposed inside the first hinge cover in a concealed manner, and the second hinge may be disposed inside the second hinge cover in a concealed manner, to implement an aesthetic design and save space. The quantity of the first hinges is one or two. When there are two first hinges, the two first hinges may be symmetrically disposed relative to a midperpendicular of the first hinge cover.

With reference to the fourth implementation of the first aspect of the embodiments of this application, in a fifth implementation of the first aspect of the embodiments of this application, the first hinge includes two hinges, the first hinge cover includes a first component and a second component, and the two hinges corresponding to the first hinge are disposed inside the first component and the second component, respectively. The first hinge cover may include the first component and the second component that are identical, and the two hinges are disposed inside the first component and the second component, respectively, and are symmetrically disposed relative to a joint between the first component and the second component. When two hinges are selected, the first hinge cover may be divided into two parts from the middle, for easy assembly.

The second hinge includes two hinges, the second hinge cover includes a third component and a fourth component, and the two hinges corresponding to the second hinge are disposed inside the third component and the fourth component, respectively. The second hinge cover may include the third component and the fourth component that are identical, and the two hinges are disposed inside the third component and the fourth component respectively, and are symmetrically disposed relative to a joint between the third component and the fourth component. When two hinges are selected, the second hinge cover may be divided into two parts from the middle, for easy assembly.

With reference to the first aspect of the embodiments of this application, the first implementation of the first aspect, the second implementation of the first aspect, or the third implementation of the first aspect, in a sixth implementation of the first aspect of the embodiments of this application, a first connector is disposed on the first hinge cover, and a second connector is disposed on the second hinge cover. After being paired, the first connector and the second connector are used for transmitting data between the keyboard dock and the tablet computer. The notebook computer provided in this embodiment is capable of performing high-speed data and current transmission.

With reference to the first aspect of the embodiments of this application, the first implementation of the first aspect, the second implementation of the first aspect, or the third implementation of the first aspect, in a seventh implementation of the first aspect of the embodiments of this application, a first high-speed near-field data transmission chip is disposed inside the first hinge cover, and a second high-speed near-field data transmission chip is disposed inside the second hinge cover. After being paired, the first high-speed near-field data transmission chip and the second high-speed near-field data transmission chip are used for transmitting data between the keyboard dock and the tablet computer. The high-speed near-field data transmission chips provided in this embodiment are near-field chips respectively disposed inside the first hinge cover and the second hinge cover in a concealed manner, thereby utilizing space of the notebook computer properly and delivering an aesthetic appearance.

With reference to the first aspect of the embodiments of this application, the first implementation of the first aspect, the second implementation of the first aspect, or the third implementation of the first aspect, in an eighth implementation of the first aspect of the embodiments of this application, a support is disposed on a back of the tablet computer, and the support is used for supporting the tablet computer. When the tablet computer is detached from the keyboard dock to implement a tablet computer mode, the support on the back of the tablet computer can be used to support the tablet computer, enabling a stand mode of the tablet computer and making the tablet computer more practical.

DESCRIPTION OF EMBODIMENTS

Embodiments of this application provide a detachable two-in-one notebook computer that is rotatable at any angle. A plurality of hinges is disposed at a tablet computer end and a keyboard dock end, and the hinges are concealed in respective hinge covers, to properly utilize space of the notebook computer and deliver an aesthetic appearance. The tablet computer can be detached from the keyboard dock, so that the notebook computer in a tablet computer mode is more lightweight and convenient, bringing more and better usage mode experience to users.

To make a person skilled in the art better understand solutions of this application, the following describes the embodiments of this application with reference to the accompanying drawings in the embodiments of this application.

In the specification, claims, and accompanying drawings of this application, the terms "first", "second", "third", "fourth", and so on (if existent) are intended to distinguish between similar objects but do not necessarily describe specific order or a specific sequence. It should be understood that the data termed in such a way is interchangeable in proper circumstances so that the embodiments described herein can be implemented in an order other than the order illustrated or described herein. Moreover, the terms "include", "contain", or any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

An embodiment of this application provides a detachable two-in-one notebook computer that is rotatable at any angle. The following describes a structure of the notebook computer in detail with reference to schematic diagrams shown in FIG. 3 to FIG. 9.

Figure 1:
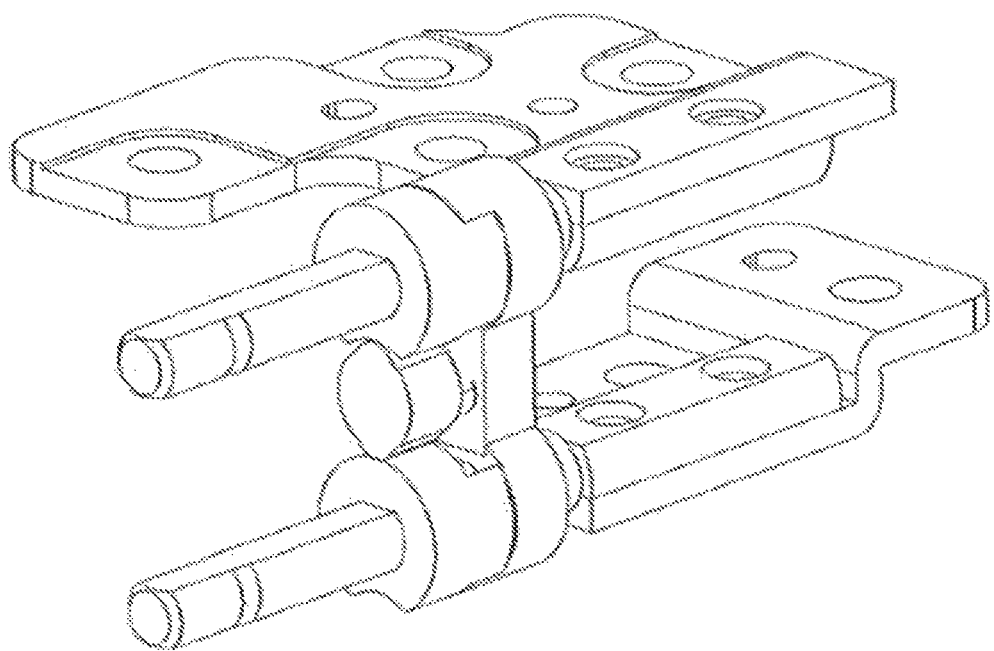
FIG. 1 is a schematic structural diagram of a dual-axis hinge in the prior art.
Figure 2:
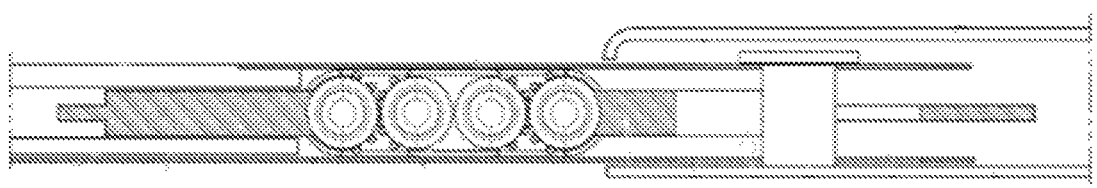
FIG. 2 is a schematic structural diagram of a chain hinge in the prior art.
Figure 3:
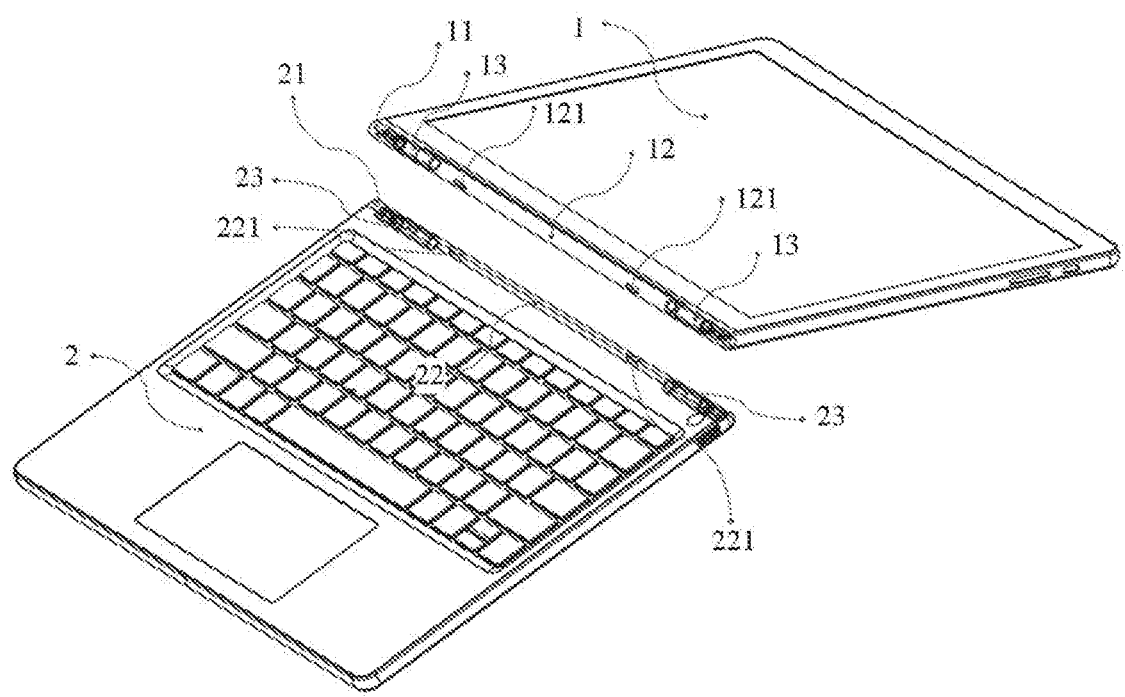
FIG. 3 is a schematic diagram of a detached structure of a notebook computer according to an embodiment of this application.

As shown in FIG. 3, the notebook computer includes a tablet computer 1 and a keyboard dock 2.

The tablet computer 1 includes a tablet computer body 11, a first hinge cover 12, and a first hinge 13. There is at least one first hinge 13. A first end of the first hinge 13 is connected to the first hinge cover 12, and a second end of the first hinge 13 is connected to the tablet computer body 11. The first hinge 13 may be disposed inside the first hinge cover 12 in a concealed manner. The first hinge 13 includes one hinge or two symmetrically disposed hinges. When the first hinge 13 includes two hinges, the first hinge cover 12 may be further divided into two parts from the middle. When the first hinge 13 includes two hinges, the two hinges are symmetrically disposed at two ends of the first hinge cover 12. The two hinges may alternatively be symmetrically disposed relative to a midperpendicular of the first hinge cover 12 at other positions of the first hinge cover 12. This is not limited herein. When the first hinge 13 includes a single hinge, the single hinge may be disposed at either end of the first hinge cover 12. This is not limited herein. The first hinge cover 12 may rotate relative to the tablet computer body 11 around a central axis (namely, a center of a hinge shaft) of the first hinge 13. A concave groove 121 is disposed on the first hinge cover 12, and the concave groove 121 may include two symmetrically disposed concave grooves. To be specific, the concave groove 121 is disposed on an outer side of the first hinge cover 12, and may include a first concave groove and a second concave groove that are symmetrically disposed relative to the midperpendicular of the first hinge cover 12.

The keyboard dock 2 includes a keyboard dock body 21, a second hinge cover 22, and a second hinge 23. There is at least one second hinge 23. A first end of the second hinge 23 is connected to the second hinge cover 22, and a second end of the second hinge 23 is connected to the keyboard dock body 21. To be specific, the second hinge cover 22 is connected to the keyboard dock body 21 by using the second hinge 23, and the second hinge cover 22 may rotate relative to the keyboard dock body 21 around a central axis of the second hinge 23. The second hinge 23 may be disposed inside the second hinge cover 22 in a concealed manner. The second hinge 23 includes one hinge or two symmetrically disposed hinges. When the second hinge 23 includes two hinges, the second hinge cover 22 may be further divided into two parts from the middle. A convex tenon 221 is disposed on the second hinge cover 22. The convex tenon 221 is disposed on an outer side of the second hinge cover 22, and may specifically include a first convex tenon and a second convex tenon that are symmetrically disposed relative to a midperpendicular of the second hinge cover 22. A linear distance between the first concave groove and the second concave groove is the same as a linear distance between the first convex tenon and the second convex tenon. In this way, the convex tenon 221 can match the concave groove 121 in a relatively aesthetic manner, to facilitate assembly of the notebook computer. The tablet computer 1 and the keyboard dock 2 are connected by using the first hinge cover 12 and the second hinge cover 22 and the first hinge cover 12 is connected to the second hinge cover 22 in a detachable manner. Specifically, the tablet computer 1 may be connected to the keyboard dock 2 by connecting the convex tenon 221 to the concave groove 121.

In a notebook mode, the first hinge cover 12 and the second hinge cover 22 are always relatively static. When the tablet computer 1 rotates from 0 degrees to 180 degrees, the first hinge cover 12, the second hinge cover 22, the second hinge 23, and the keyboard dock body 21 are relatively static, and the tablet computer body 11 rotates relative to the first hinge cover 12 around the first hinge 13. When the tablet computer 1 rotates to 180 degrees, the first hinge 13 is locked, the tablet computer body 11 stops rotating, and the second hinge 23 starts working. When the tablet computer 1 rotates from 180 degrees to 360 degrees, the tablet computer body 11, the first hinge cover 12, the first hinge 13, and the second hinge cover 22 are relatively static, and the keyboard dock body 21 rotates relative to the second hinge cover 22 around the second hinge 23.

According to the notebook computer provided in this embodiment of this application, independent hinges and hinge covers are separately disposed at a tablet computer end and a keyboard dock end, and the hinges are concealed in the respective hinge covers, thereby saving space, beautifying an appearance, and reducing costs. The notebook computer supports 360-degree flipping, and also allows the tablet computer to be detached from the keyboard dock, so that the notebook computer in the tablet computer mode is more lightweight and convenient, bringing more and better usage mode experience to users.

Figure 4:
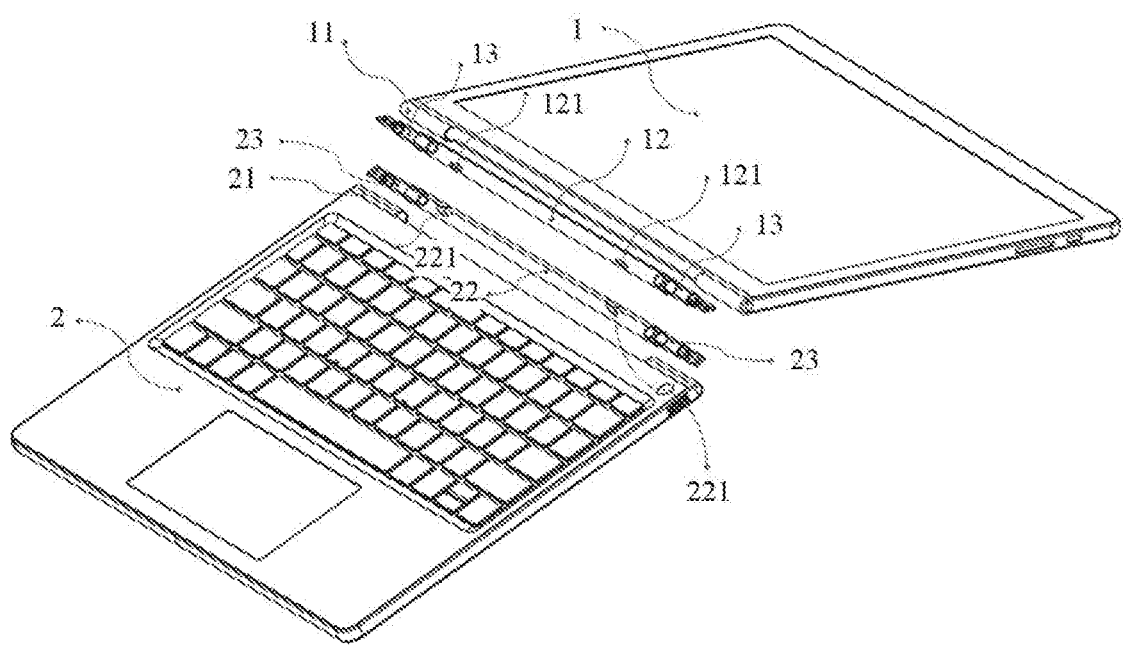
FIG. 4 is a schematic diagram of another detached structure of a notebook computer according to an embodiment of this application.

Based on the structure shown in FIG. 3, FIG. 4 is a diagram illustrating that the first hinge 13 is detached from the tablet computer body 11 and the second hinge 23 is detached from the keyboard dock 21. A body structure shown in FIG. 4 is the same as that shown in FIG. 3, and details are not described herein again: The convex tenon 221 may be connected to the concave groove 121 to assemble a notebook computer and implement a notebook computer mode; or the convex tenon 221 may be detached from the concave groove 121 to implement the tablet computer mode. In other words, the tablet computer 1 is connected to the keyboard dock 2 by connecting the convex tenon 221 to the concave groove 121, to implement the notebook computer mode; or the tablet computer 1 is separated from the keyboard dock 2 by detaching the convex tenon 221 from the concave groove 121, to implement the tablet computer mode.

Figure 5:
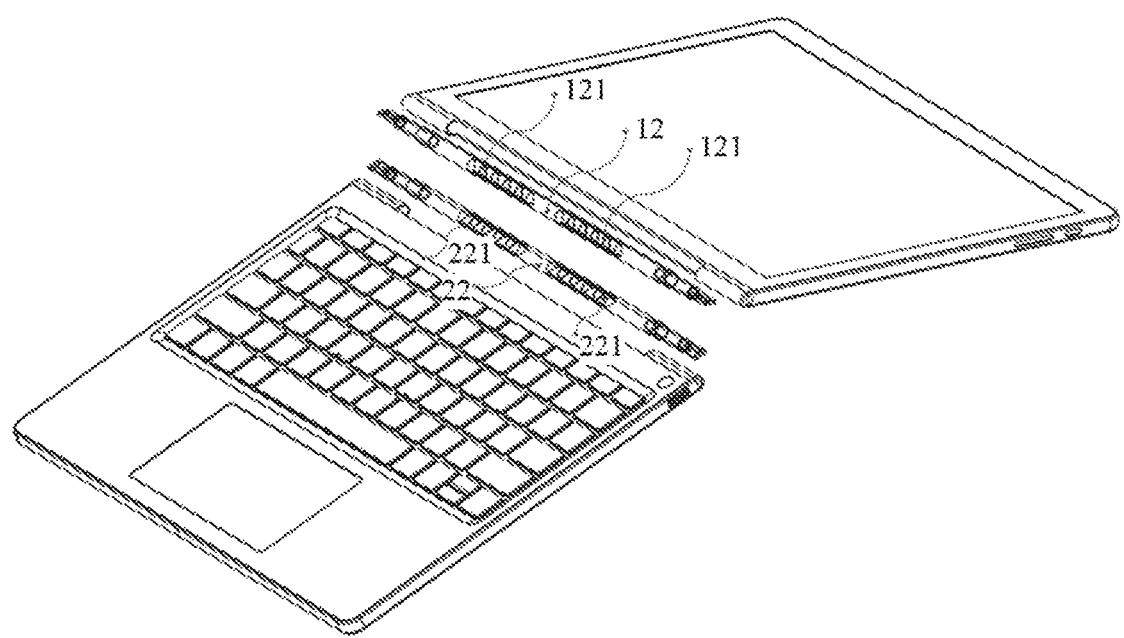
FIG. 5 is a schematic diagram of another detached structure of a notebook computer according to an embodiment of this application.

A body structure shown in FIG. 5 is basically the same as that shown in FIG. 4. For a same or corresponding technical feature, refer to FIG. 4. A difference is that, in FIG. 5, the first hinge cover 12 is mimetically connected to the second hinge cover 22 by using a first magnet 122 disposed inside the first hinge cover 12 and a second magnet 222 disposed inside the second hinge cover 22. The magnets are permanent magnets or electromagnets. In this implementation, the concave groove 121 and the convex tenon 221 may not need to be disposed on the first hinge cover 12 and the second hinge cover 22.

Figure 6:
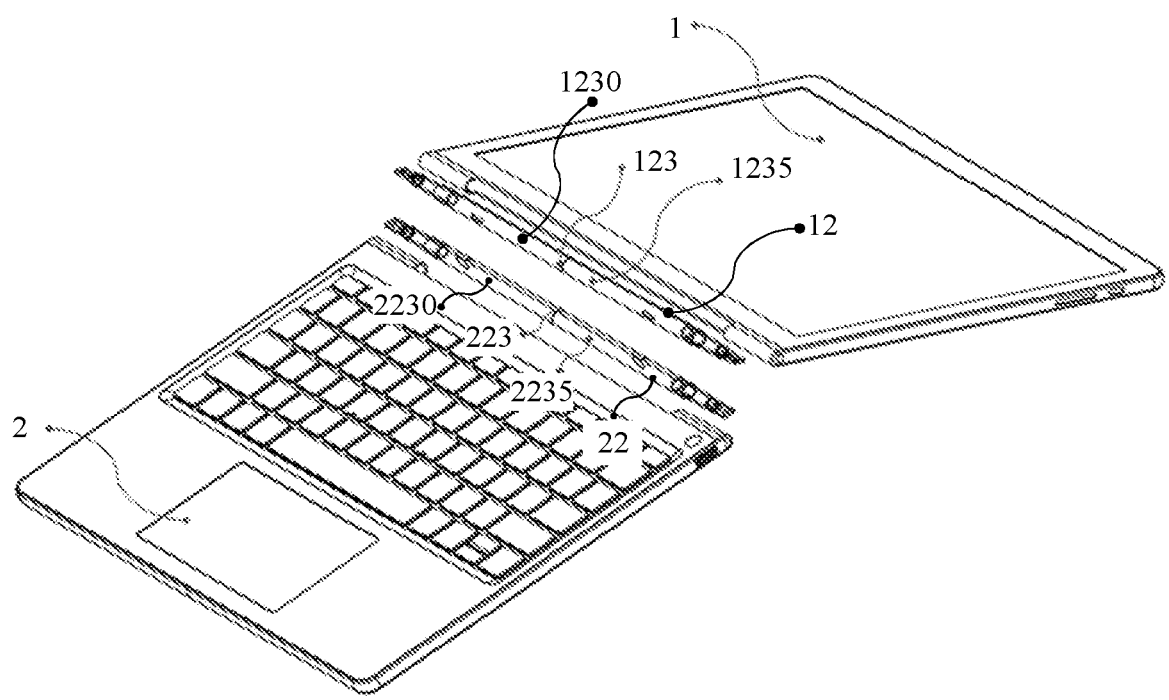
FIG. 6 is a schematic diagram of another detached structure of a notebook computer according to an embodiment of this application.

A body structure shown in FIG. 6 is basically the same as that shown in FIG. 4. For a same or corresponding technical feature, refer to FIG. 4. A difference is that, in FIG. 6, when two hinges are disposed on the tablet computer I and two hinges are disposed on the keyboard dock 2, the first hinge cover 12 may be divided at a middle position 123 into a first component 1230 and a second component 1235, and the second hinge cover 22 may be divided at a middle position 223 into a third component 2230 and a fourth component 2235.

Figure 7:
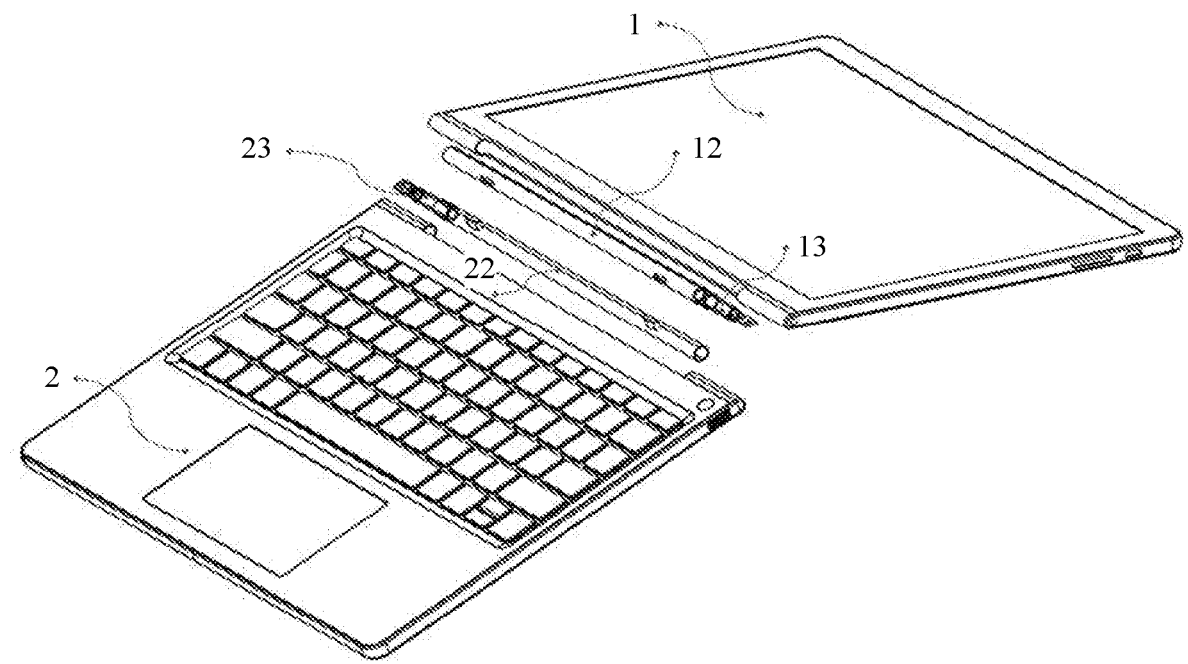
FIG. 7 is a schematic diagram of another detached structure of a notebook computer according to an embodiment of this application.

A body structure shown in FIG. 7 is basically the same as that shown in FIG. 4. For a same or corresponding technical feature, refer to FIG. 4. A difference is as follows: In FIG. 4, there are two first hinges 13 and two second hinges 23; in FIG. 7, there is one first hinge 13 and one second hinge 23, and a single hinge may be disposed at either end, left or right, of each hinge cover (the first hinge cover 12 and the second hinge cover 22). FIG. 7 is merely a schematic diagram of a disposition manner of the single hinge, and the disposition manner of the single hinge is not limited to the embodiment shown in FIG. 7. As shown in FIG. 7, when both the quantity of the first hinges 13 and the quantity of the second hinges 23 are one, the first hinge cover 12 and the second hinge cover 22 cannot be divided from the middle.

Figure 8:
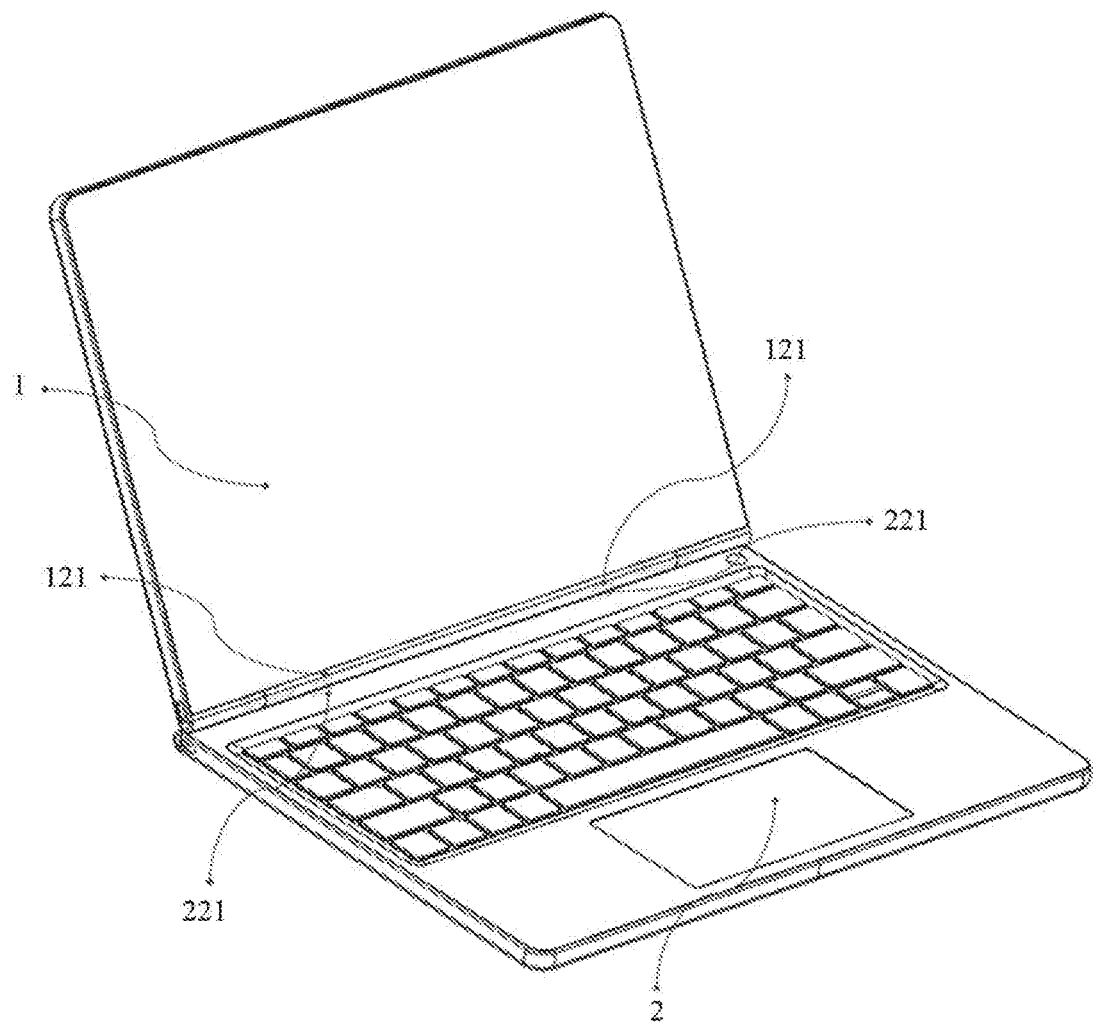
FIG. 8 is a schematic diagram of a combined structure of a notebook computer according to an embodiment of this application.

According to FIG. 3, FIG. 8 is a schematic assembly diagram illustrating that the tablet computer 1 of the notebook computer is connected to the keyboard dock 2 by connecting the convex tenon 221 to the concave groove 121. A body structure shown in FIG. 8 is the same as that shown in FIG. 3, and details are not described herein again.

Figure 9:
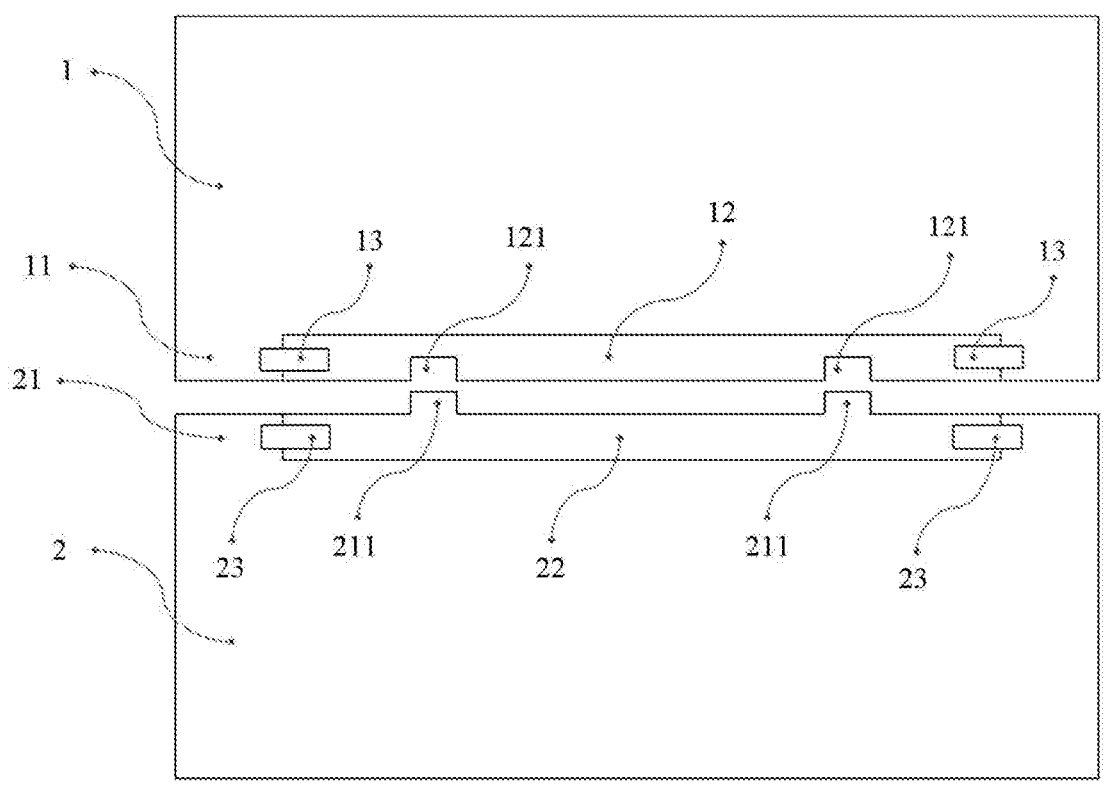
FIG. 9 is a schematic diagram of a planar structure of a notebook computer according to an embodiment of this application.

FIG. 9 is a schematic diagram of a planar structure of the tablet computer 1 and the keyboard dock 2 in an unfolded mode based on the notebook computer structure shown in FIG. 3. A body structure shown in FIG. 9 is the same as that shown in FIG. 3, and details are not described herein again.

Figure 10:
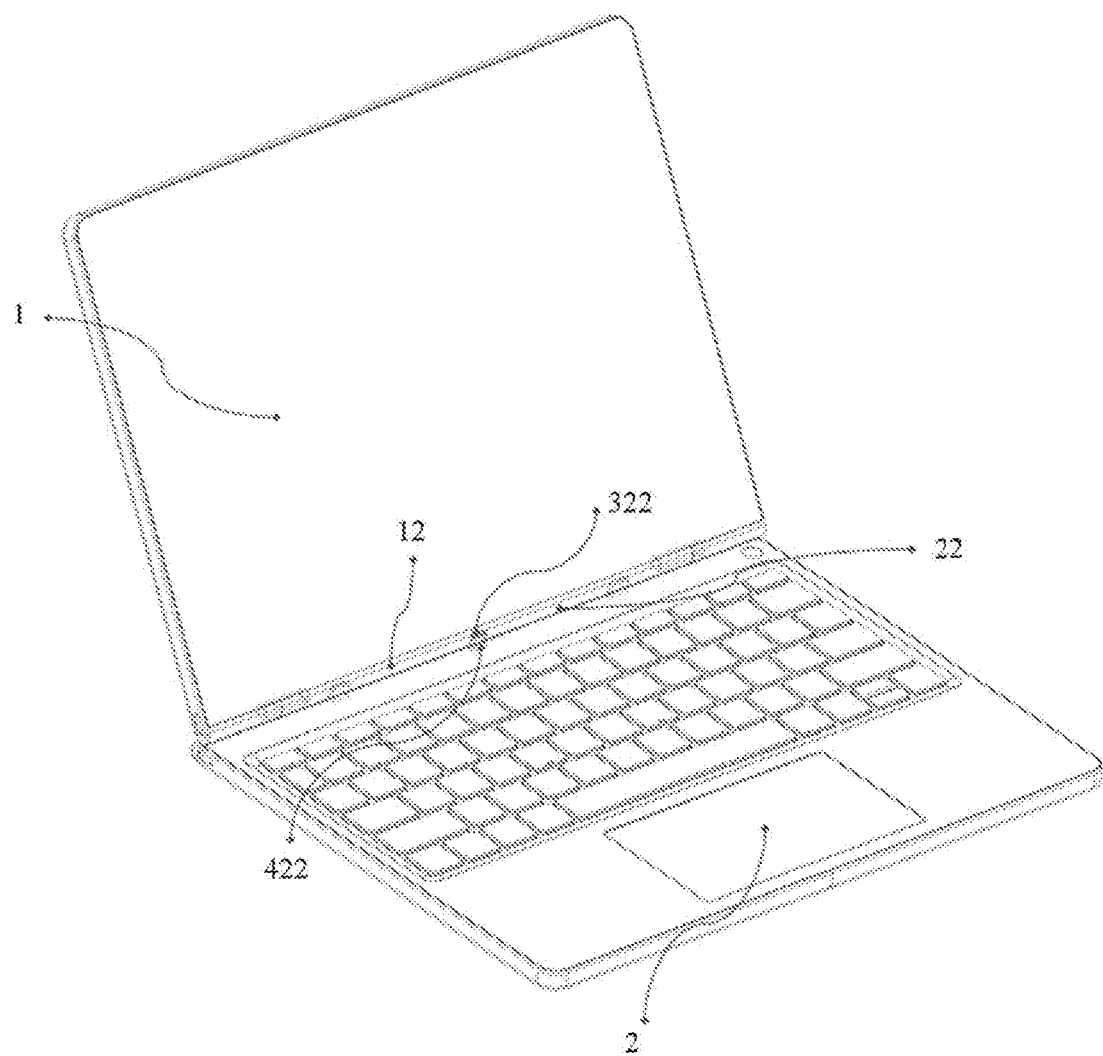
FIG. 10 is a schematic diagram of another combined structure of a notebook computer according to an embodiment of this application.

A body structure shown in FIG. 10 is basically the same as that shown in FIG. 3. A difference is that, in the notebook computer mode, pairing connectors (connector) are disposed on the first hinge cover 12 of the tablet computer 1 and the second hinge cover 22 of the corresponding keyboard dock 2 for the notebook computer shown in FIG. 10. Specifically, a first connector 322 is disposed on the first hinge cover 12, and a second connector 422 is disposed on the second hinge cover 22. After being paired, the first connector 322 and the second connector 422 are used for transmitting data (for example, transmitting a keyboard signal or a graphics card signal of a keyboard end) between the keyboard dock 2 and the tablet computer 1. The notebook computer provided in this embodiment is capable of performing high-speed data and current transmission.

Figure 11:
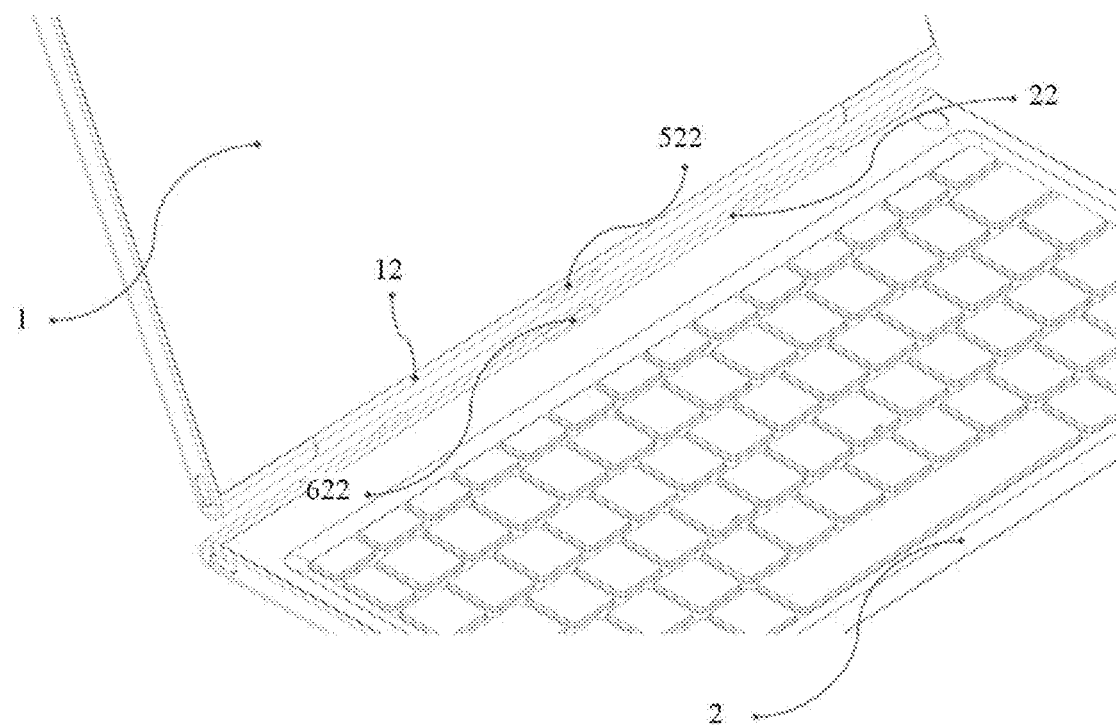
FIG. 11 is a schematic diagram of a partial structure of a notebook computer according to an embodiment of this application.

A body structure shown in FIG. 11 is basically the same as that shown in FIG. 3. A difference is that, in the notebook computer mode, high-speed near-field data transmission chips (including but not limited to NFC) for pairing are disposed inside the first hinge cover 12 of the tablet computer 1 and the second hinge cover 22 of the corresponding keyboard dock 2 for the notebook computer shown in FIG. 11. Specifically, a first high-speed near-field data transmission chip 522 is disposed inside the first hinge cover 12, and a second high-speed near-field data transmission chip 622 is disposed inside the second hinge cover 22. After being paired, the first high-speed near-field data transmission chip 522 and the second high-speed near-field data transmission chip 622 are used for transmitting data (for example, transmitting a keyboard signal or a graphics card signal of a keyboard end) between the keyboard dock 2 and the tablet computer 1. The high-speed near-field data transmission chips 122 and 222 provided in this embodiment are near-field chips respectively disposed inside the first hinge cover 12 and the second hinge cover 22 in a concealed manner, thereby utilizing space of the notebook computer properly and delivering an aesthetic appearance.

Figure 12:
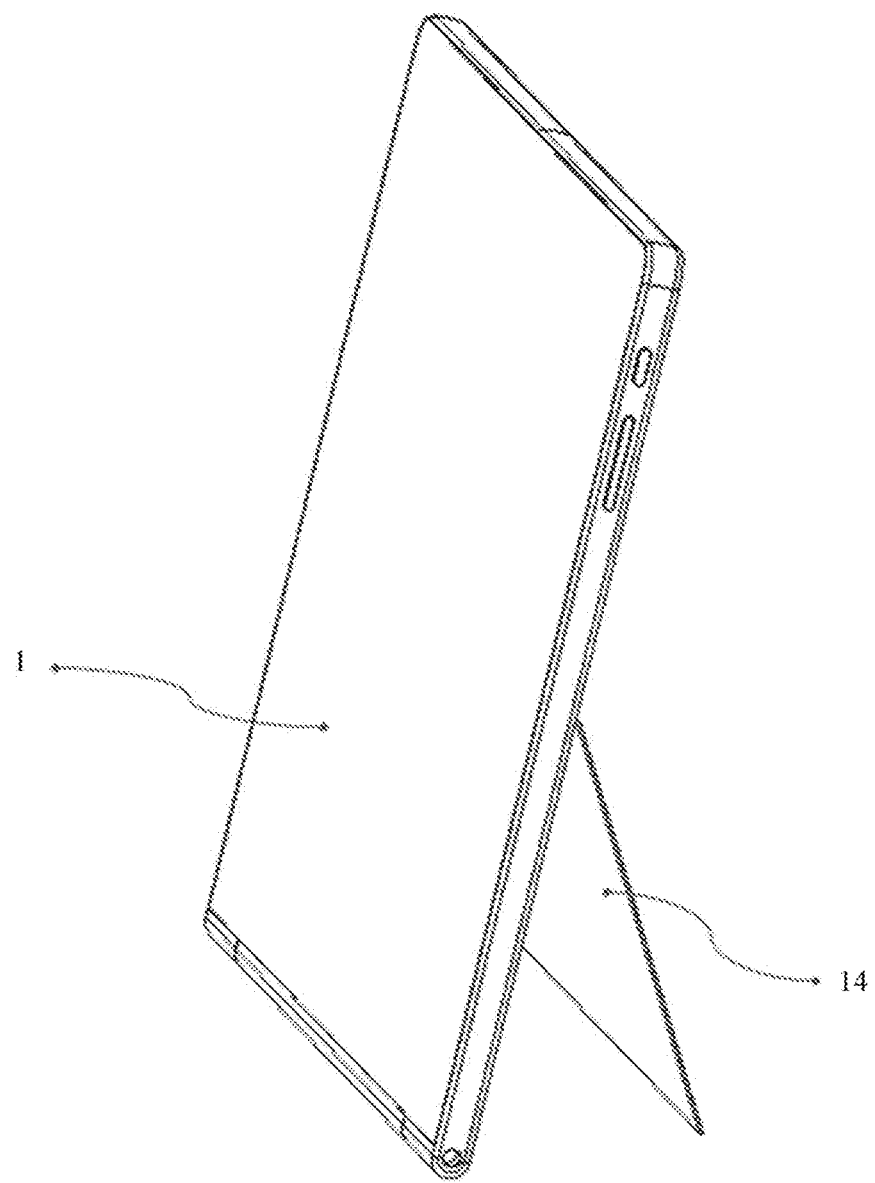
FIG. 12 is a schematic diagram of another detached structure of a notebook computer according to an embodiment of this application.

As shown in FIG. 12, a support 14 may be further added on a back of the tablet computer 1. A structure of a tablet computer 1 shown in FIG. 12 is the same as a structure of the tablet computer 1 shown in FIG. 3 and details are not described herein again. It should be noted that when the tablet computer 1 is detached from the keyboard dock 2 to implement the tablet computer mode, the support 14 on the back of the tablet computer 1 can be used to support the tablet computer 1, enabling a stand mode of the tablet computer 1 and increasing practicability.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections between some interfaces, apparatuses or units, and may be implemented in electronic, mechanical, or other forms.

The units described as separate parts may or may not be physically separate. Parts displayed as units may or may not be physical units, and may be located in one position or distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. A notebook computer, comprising:
a tablet computer comprising a tablet computer body, a first hinge cover, and a first hinge, wherein the first hinge cover is a first cylindrical cover coupled to the tablet computer body via the first hinge, wherein the first hinge comprises a first end and a second end, wherein the first hinge first end is connected to the first hinge cover, wherein the first hinge second end is connected to the tablet computer body, wherein the first hinge cover rotates relative to the tablet computer body around a central axis of the first hinge, and wherein the first hinge central axis passes through the first hinge first end and the first hinge second end; and
a keyboard dock comprising a keyboard dock body, a second hinge cover, and a second hinge, wherein the second hinge cover is a second cylindrical cover coupled to the keyboard dock body via the second hinge, wherein the second hinge comprises a second hinge first end and a second hinge second end, wherein the second hinge first end is connected to the second hinge cover, wherein the second hinge second end is connected to the keyboard dock body, wherein the second hinge cover rotates relative to the keyboard dock body around a central axis of the second hinge, wherein the second hinge central axis passes through the second hinge first end and the second hinge second end, wherein the tablet computer and the keyboard dock are connected using the first hinge cover and the second hinge cover, and wherein the first cylindrical cover of the first hinge cover outside the tablet computer body is connected in a detachable manner to and in direct surface contact with the second cylindrical cover of the second hinge cover outside the keyboard dock body.

2. The notebook computer of claim 1, wherein a concave groove is disposed on the first hinge cover, wherein a convex tenon is disposed on the second hinge cover, and wherein the first hinge cover is connected to the second hinge cover by connecting the convex tenon to the concave groove.

3. The notebook computer of claim 2, wherein the concave groove comprises a first concave groove and a second concave groove that are disposed on an outer side of the first hinge cover, wherein the convex tenon comprises a first convex tenon and a second convex tenon that are disposed on an outer side of the second hinge cover, and wherein a linear distance between the first concave groove and the second concave groove is the same as a linear distance between the first convex tenon and the second convex tenon.

4. The notebook computer of claim 1, wherein a first magnet is disposed inside the first hinge cover, wherein a second magnet is disposed inside the second hinge cover, and wherein the first hinge cover is magnetically connected to the second hinge cover using the first magnet and the second magnet.

5. The notebook computer of claim 1, comprising one or two first hinges and one or two second hinges, wherein the one or two first hinges are disposed inside the first hinge cover, and wherein the one or two second hinges are disposed inside the second hinge cover.

6. The notebook computer of claim 1, comprising two first hinges and two second hinges, wherein the first hinge cover comprises a first component and a second component, wherein the two first hinges are disposed inside the first component and the second component, respectively, wherein the second hinge cover comprises a third component and a fourth component, and wherein the two second hinges are disposed inside the third component and the fourth component, respectively.

7. The notebook computer of claim 1, wherein a first connector is disposed on the first hinge cover, wherein a second connector is disposed on the second hinge cover, and wherein the first connector and the second connector are configured to transmit data between the keyboard dock and the tablet computer after the keyboard dock and the tablet computer are paired.

8. The notebook computer of claim 1, wherein a first high-speed near-field data transmission chip is disposed inside the first hinge cover, wherein a second high-speed near-field data transmission chip is disposed inside the second hinge cover, and wherein the first high-speed near-field data transmission chip and the second high-speed near-field data transmission chip are configured to transmit data between the keyboard dock and the tablet computer after the keyboard dock and the tablet computer are paired.

9. The notebook computer of claim 1, wherein a support is disposed on a back of the tablet computer and supports the tablet computer.

10. The notebook computer of claim 4, wherein the first magnet and the second magnet comprise permanent magnets.

11. The notebook computer of claim 4, wherein the first magnet and the second magnet comprise electromagnets.

12. The notebook computer of claim 7, wherein the first connector and the second connector comprise wired connectors.

13. The notebook computer of claim 7, wherein the first connector and the second connector comprise wireless connectors.

14. The notebook computer of claim 7, wherein the first connector and the second connector comprise Near Field Communication (NFC) connectors.

15. The notebook computer of claim 1, wherein the tablet computer and the keyboard dock are configured to switch between notebook, tablet, stand, and tent configurations.

16. The notebook computer of claim 1, wherein the tablet computer comprises a touchscreen, wherein the keyboard dock comprises a keyboard and a mouse pad, and wherein the tablet computer and the keyboard dock are communicatively coupled together.

17. The notebook computer of claim 1, wherein the first hinge first end and the first hinge second end are facing each other.

18. The notebook computer of claim 1, wherein the second hinge first end and the second hinge second end are facing each other.

19. The notebook computer of claim 1, wherein the first hinge comprises a first portion and a second portion, wherein the first hinge first portion comprises the first hinge first end and is disposed within the first hinge cover, wherein the first hinge second portion comprises the first hinge second end and is disposed within the tablet computer body, and wherein the first hinge first portion and the first hinge second portion do not overlap with each other.

20. The notebook computer of claim 1, wherein the second hinge comprises a first portion and a second portion, wherein the second hinge first portion comprises the second hinge first end and is disposed within the second hinge cover, wherein the second hinge second portion comprises the second hinge second end and is disposed within the keyboard dock body, and wherein the second hinge first portion and the second hinge second portion do not overlap with each other.

\* \* \* \* \*